US012488937B2

(12) United States Patent
Arai et al.

(10) Patent No.: US 12,488,937 B2
(45) Date of Patent: Dec. 2, 2025

(54) INDUCTOR

(71) Applicant: Murata Manufacturing Co., Ltd., Kyoto-fu (JP)

(72) Inventors: Takumi Arai, Nagaokakyo (JP); Motoki Toyama, Nagaokakyo (JP); Daigo Mizumura, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 846 days.

(21) Appl. No.: 17/656,447

(22) Filed: Mar. 25, 2022

(65) Prior Publication Data

US 2022/0310308 A1 Sep. 29, 2022

(30) Foreign Application Priority Data

Mar. 26, 2021 (JP) ................................ 2021-054102

(51) Int. Cl.
*H01F 17/04* (2006.01)
*H01F 27/28* (2006.01)
*H01F 27/29* (2006.01)

(52) U.S. Cl.
CPC .......... *H01F 27/292* (2013.01); *H01F 17/04* (2013.01); *H01F 27/2828* (2013.01); *H01F 2017/048* (2013.01)

(58) Field of Classification Search
CPC .................................................... H01F 27/292
USPC ......................................................... 336/221
See application file for complete search history.

(56) References Cited

U.S. PATENT DOCUMENTS 5,500,629 A * 3/1996 Meyer .................. H03H 7/0115 336/175
2019/0272945 A1* 9/2019 Arai ........................ H01F 27/28

FOREIGN PATENT DOCUMENTS

CN 104752038 A 7/2015
CN 110223828 A 9/2019
CN 110223829 A 9/2019
JP 2019-153642 A 9/2019

* cited by examiner

*Primary Examiner* — Ronald Hinson
(74) *Attorney, Agent, or Firm* — Studebaker Brackett PLLC

(57) ABSTRACT

An inductor capable of suppressing deformation of a conductive wire portion in a core. The inductor includes a conductor is embedded in a core containing magnetic powder. The core includes a mounting surface facing a mounting substrate side at the time of mounting, and a pair of end surfaces orthogonal to the mounting surface. The inductor includes a conductive wire portion extending inside the core over the pair of end surfaces and an electrode portion led out from each of the pair of end surfaces and extending along the end surface and the mounting surface. The conductive wire portion includes a reinforcing portion.

8 Claims, 12 Drawing Sheets

| REINFORCING PORTION | LT SURFACE |
| --- | --- |
| PRESENT |   |
| NOT PRESENT |   |

INDUCTOR

CROSS-REFERENCE TO RELATED APPLICATION

This application claims benefit of priority to Japanese Patent Application No. 2021-054102, filed Mar. 26, 2021, the entire content of which is incorporated herein by reference.

BACKGROUND

Technical Field

The present disclosure relates to an inductor.

Background Art

Japanese Patent Application Laid-Open No. 2019-153642 discloses "a surface-mounted inductor including a molded body made of a composite material containing magnetic powder and a metal plate including a first metal plate portion embedded in the molded body and a second metal plate portion extending from an end portion of the first metal plate portion to the outside of the molded body, in which the second metal plate portion is extended from a side surface or a side of a mounting surface of the molded body, disposed along the molded body with a bent portion, and forms an external terminal disposed at least on the mounting surface side of the molded body".

SUMMARY

In an inductor having a configuration in which a conductive wire portion extending linearly is embedded in a core as in Japanese Patent Application Laid-Open No. 2019-153642, when deformation occurs in the conductive wire portion during molding of the core or the like, characteristics such as an inductance value and a DC superimposed current are deteriorated.

Accordingly, the present disclosure provides an inductor capable of suppressing deformation of a conductive wire portion in a core.

According to an aspect of the present disclosure, there is provided an inductor in which a conductor is embedded in a core containing magnetic powder. The core includes a mounting surface facing a mounting substrate side at a time of mounting and a pair of end surfaces orthogonal to the mounting surface. The inductor includes a conductive wire portion extending inside the core over the pair of end surfaces and an electrode portion led out from each of the pair of end surfaces and extending along the end surface and the mounting surface. The conductive wire portion includes a reinforcing portion.

According to the present disclosure, deformation of the conductive wire portion in the core can be suppressed.

DETAILED DESCRIPTION

Hereinafter, embodiments of the present disclosure will be described with reference to the drawings.

Figure 1:
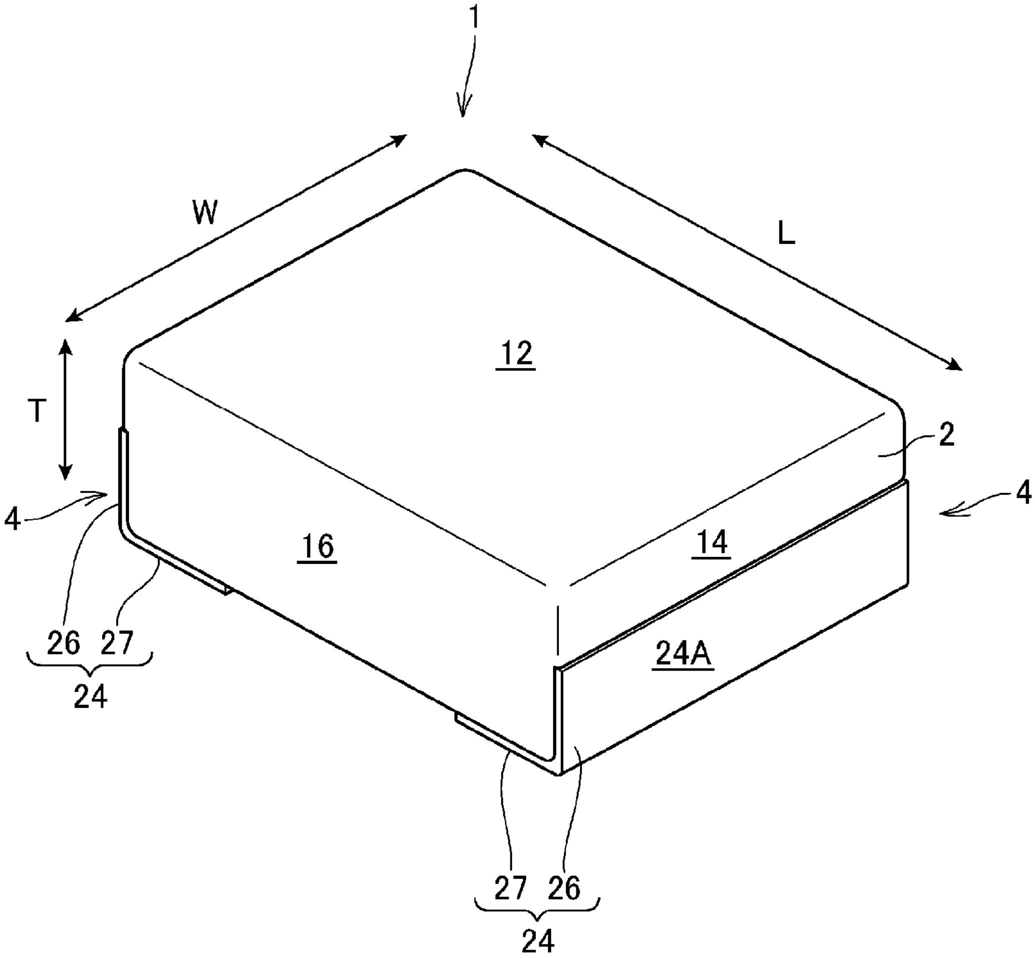
FIG. 1 is a perspective view when an inductor according to an embodiment of the present disclosure is viewed from an upper surface side.
Figure 2:
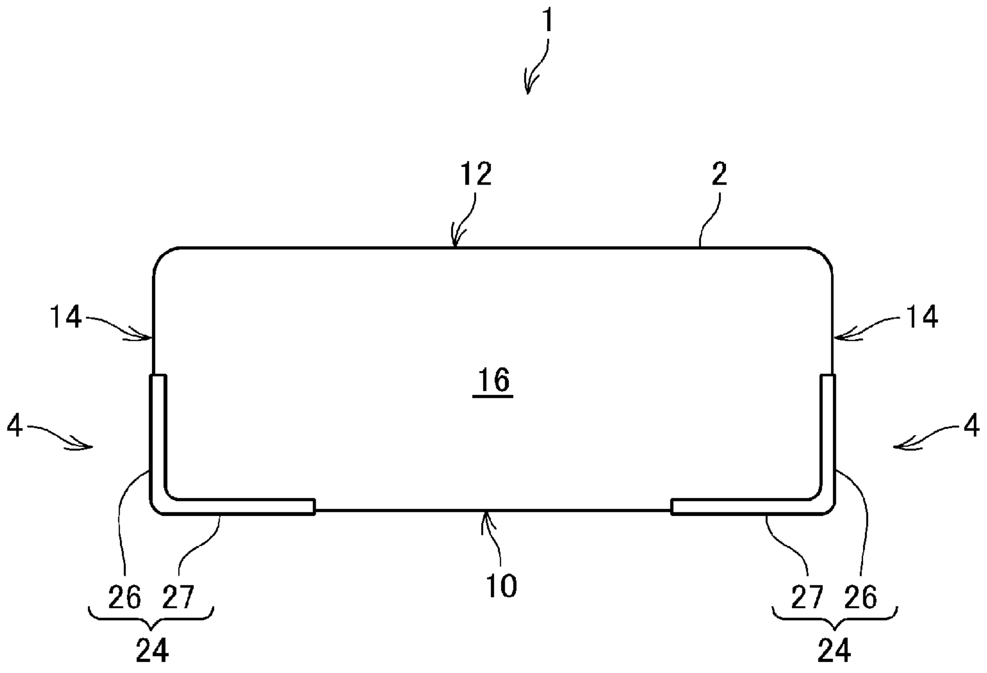
FIG. 2 is a plan view of a side surface of the inductor.
Figure 3:
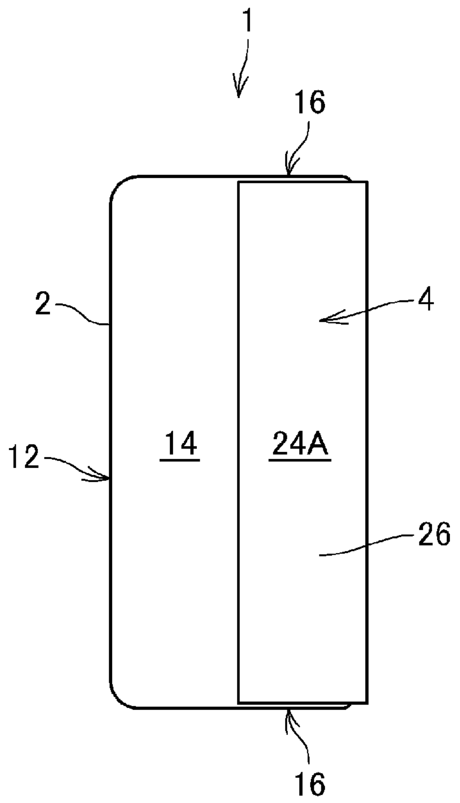
FIG. 3 is a plan view of an end surface of the inductor.
Figure 4:
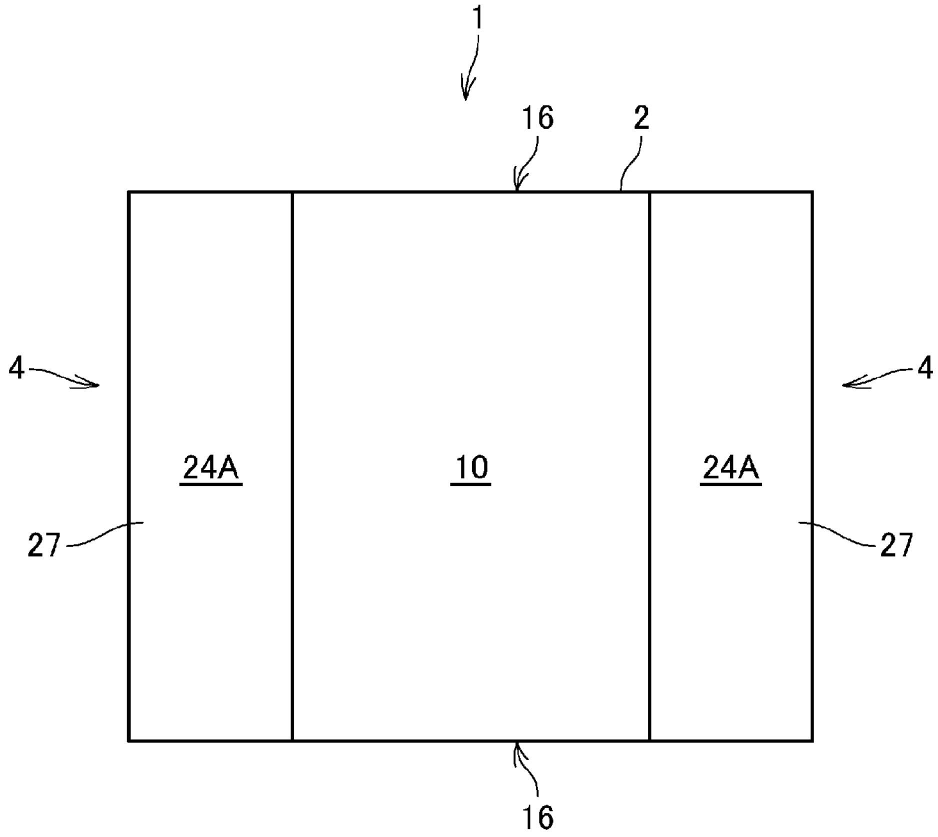
FIG. 4 is a plan view of a mounting surface of the inductor.

FIG. 1 is a perspective view when an inductor 1 according to the present embodiment is viewed from an upper surface 12 side. FIG. 2 is a plan view of a side surface 16 of the inductor 1, FIG. 3 is a plan view of an end surface 14 of the inductor 1, and FIG. 4 is a plan view of a mounting surface 10 of the inductor 1.

The inductor 1 of the present embodiment is configured as a surface mount electronic component, and includes an element body 2 having a substantially rectangular parallelepiped shape and a pair of external electrodes 4 provided on the surface of the element body 2.

Hereinafter, in the element body 2, a surface facing a mounting substrate (not illustrated) at the time of mounting is defined as a mounting surface 10 (FIG. 4), a surface facing the mounting surface 10 is referred to as an upper surface 12, a pair of surfaces orthogonal to the mounting surface 10 is referred to as end surfaces 14, and a pair of surfaces orthogonal to the mounting surface 10 and the pair of end surfaces 14 is referred to as side surfaces 16.

As illustrated in FIG. 1, a distance from the mounting surface 10 to the upper surface 12 is defined as a thickness T of the element body 2, a distance between the pair of side surfaces 16 is defined as a width W of the element body 2, and a distance between the pair of end surfaces 14 is defined as a length L of the element body 2.

Figure 5:
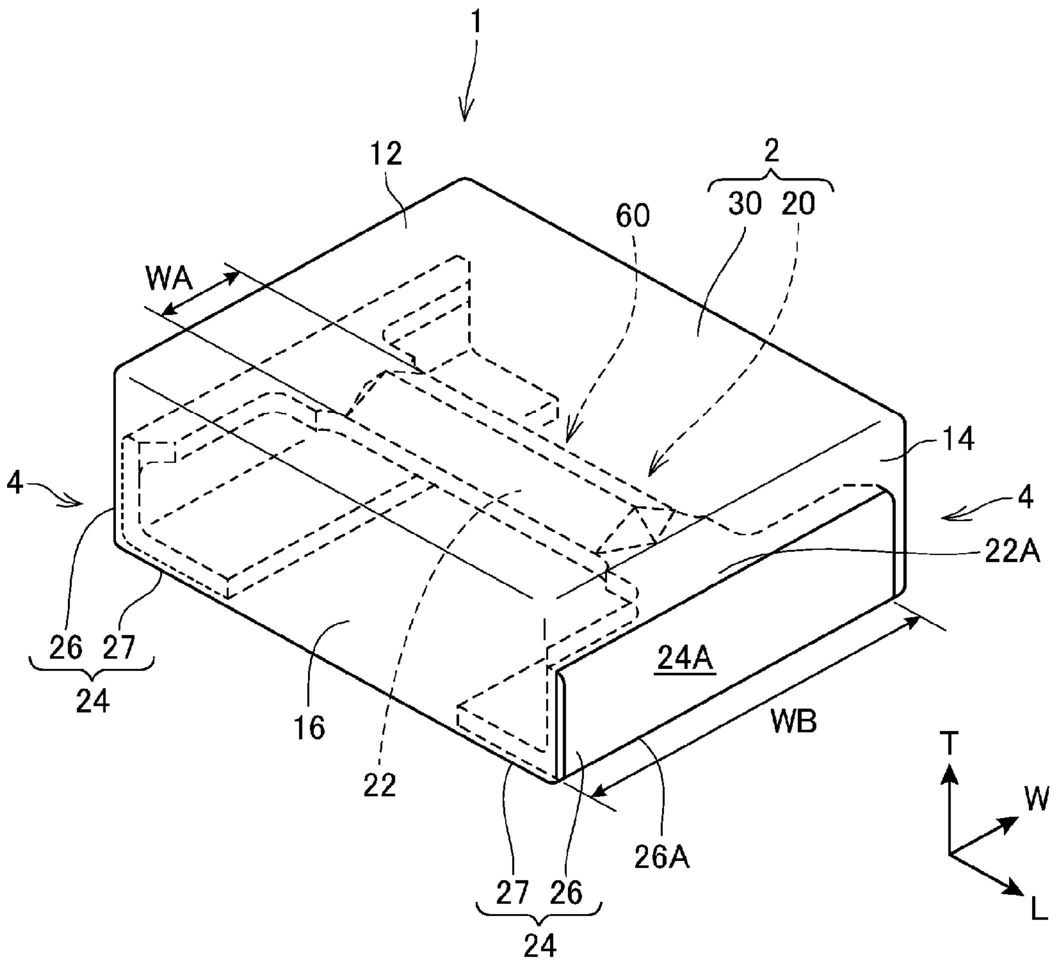
FIG. 5 is a perspective view illustrating an internal configuration of the inductor.

FIG. 5 is a perspective view illustrating an internal configuration of the inductor 1.

The element body 2 includes a conductor 20 and a core 30 having a substantially rectangular shape in which the conductor 20 is embedded, and is configured as a conductor-sealed magnetic component in which the conductor 20 is sealed in the core 30.

The core 30 is a molded body obtained by compression-molding a mixed powder obtained by mixing a magnetic powder and a resin into a substantially rectangular parallelepiped shape by pressurizing and heating the mixed powder in a state where the conductor 20 is incorporated in the core. There is an oxide insulating film oxidized more than the inside of the core 30 on the surface of the core 30. In the mixed powder of the present embodiment, barium sulfate is mixed as a lubricant in addition to the magnetic powder and the resin.

The mixed powder of the present embodiment has a resin amount of about 3.1 wt % with respect to the magnetic powder.

In addition, the magnetic powder of the present embodiment includes particles having two types of particle sizes, that is, large first magnetic particles having a relatively large average particle diameter and small second magnetic particles having a relatively small average particle diameter. During the compression molding, the small second magnetic particles enter between the large first magnetic particles together with the resin, so that a filling factor of the core 30 can increase, and magnetic permeability can also increase.

Here, a compounding ratio (weight ratio) of the first magnetic particles and the second magnetic particles is 70:30 to 85:15, preferably 70:30 to 80:20, and 75:25 in the present embodiment.

In addition, a ratio of the average particle diameter of the first magnetic particles to the average particle diameter of the second magnetic particles is preferably 5.0 or more.

Note that the magnetic powder may include particles having an average particle diameter between the average particle diameters of the first magnetic particles and the second magnetic particles, and thus, includes particles having three or more kinds of particle sizes.

In the present embodiment, each of the first magnetic particles and the second magnetic particles is a particle having a metal particle and an insulating film covering the surface the metal particle, the metal particle is made of Fe—Si-based amorphous alloy powder, and the insulating film is made of zinc phosphate. By covering the metal particles with the insulating film, insulating resistance and withstand voltage increase.

In the first magnetic particles, Cr-less Fe—C—Si alloy powder, Fe—Ni—Al alloy powder, Fe—Cr—Al alloy powder, Fe—Si—Al alloy powder, Fe—Ni alloy powder, and Fe—Ni—Mo alloy powder may be used as the metal particles.

In the first magnetic particles and the second magnetic particles, another phosphate (magnesium phosphate, calcium phosphate, manganese phosphate, cadmium phosphate, or the like) or a resin material (silicone-based resin, epoxy-based resin, phenol-based resin, polyamide-based resin, polyimide-based resin, polyphenylene sulfide-based resin, and the like) may be used for the insulating film.

In the mixed powder of the present embodiment, an epoxy resin containing a bisphenol A type epoxy resin as a main agent is used as a material of the resin.

The epoxy resin may be a phenol novolak-type epoxy resin.

The material of the resin may be other than the epoxy resin, and may be two or more kinds instead of one kind. For example, as the material of the resin, a thermosetting resin such as a phenol resin, a polyester resin, a polyimide resin, or a polyolefin resin can be used in addition to the epoxy resin.

As illustrated in FIG. 5, the conductor 20 includes a conductive wire portion 22 extending inside the core 30 over the pair of end surfaces 14, and an electrode portion 24 integrally formed at both ends of the conductive wire portion 22.

A surface 24A of the electrode portion 24 is exposed from each of the end surface 14 of the core 30 and the mounting surface 10, and nickel (Ni) plating and tin (Sn) plating are sequentially applied to the surfaces 24A to form the external electrode 4 in order to secure mountability. Then, the external electrode 4 formed on the mounting surface 10 is electrically connected to a wire of a circuit board by appropriate mounting means such as solder.

In the present embodiment, as illustrated in FIGS. 1 to 5, the electrode portion 24 of the conductor 20 is embedded in the core 30 in a state where only the surface 24A is substantially exposed on the mounting surface 10 and the end surface 14, and thus, an amount of protrusion of the electrode portion 24 from the core 30 is suppressed. As a result, since it is hardly necessary to consider the protrusion of the electrode portion 24, the core 30 can be made as large as a specified size of the inductor 1, and the inductor 1 having a small size and a low height but high performance can be realized.

When a length of the conductive wire portion 22 in the direction of the width W of the core 30 is defined as a conductive wire portion width WA and a length of the electrode portion 24 is defined as an electrode width WB, as illustrated in FIG. 5, the electrode width WB of the electrode portion 24 of the present embodiment is wider than the conductive wire portion width WA, and the resistance in DC resistance is reduced.

The electrode portion 24 is formed in a substantially L shape in an LT cut surface on an LT plane including the respective directions of a length L and a thickness T of the core 30.

Specifically, the electrode portion 24 includes a first electrode portion 26 that extends while being bent substantially vertically at the end portion 22A of the conductive wire portion 22 and a second electrode portion 27 that extends while being bent substantially vertically at a lower end portion 26A of the first electrode portion 26, and the first electrode portion 26 and the second electrode portion 27 form an L shape. The surfaces 24A of the first electrode portion 26 and the second electrode portion 27 are exposed from the end surface 14 and the mounting surface 10 of the core 30 to constitute the external electrode 4.

According to the electrode portion 24, as compared with a case where the conductive wire portion 22 and the electrode portion 24 (external electrode 4) are configured separately, since there is no joint surface between the conductive wire portion 22 and the electrode portion 24 (external electrode 4) which are low electrical resistance regions where a current mainly flows in the external electrode 4, a resistance value can be suppressed, and a large current can flow.

Furthermore, the conductor 20 of the present embodiment is formed of tough pitch copper, and allows a larger current to flow.

Based on the above configuration, the inductor 1 according to the present embodiment has an inductance value of about 10 nH or more in a size of about 2.5 mm in length L, about 2.0 mm in width W, and about 1.0 mm in thickness T, and is capable of achieving performance of about 0.85 mΩ or less in DC resistance, 15 A or more in rated current for temperature rise (when the temperature rises by 40° C.), and 15 A or more in DC superposed current (when the frequency is 1 MHz).

The inductor 1 is used as a power supply circuit including a charge pump type DC-DC converter that boosts a voltage by a capacitor and a switch and an LC filter, and an impedance matching coil (matching coil) of a high frequency circuit, and is used for electronic devices such as a personal computer, a DVD player, a digital camera, a TV, a mobile phone, a smartphone, car electronics, and medical/industrial machines. However, the application of the inductor 1 is not limited thereto, and the inductor 1 can also be used for, for example, a tuning circuit, a filter circuit, a rectifying and smoothing circuit, and the like.

In the inductor 1, an element-body protective layer may be formed on the entire surface of the element body 2 excluding the range of the external electrode 4. As a material of the element-body protective layer, for example, a thermosetting resin such as an epoxy resin, a polyimide resin, or a phenol resin, or a thermoplastic resin such as a polyethylene resin or a polyamide resin can be used. These resins may further contain a filler containing silicon oxide, titanium oxide, or the like.

Figure 6:
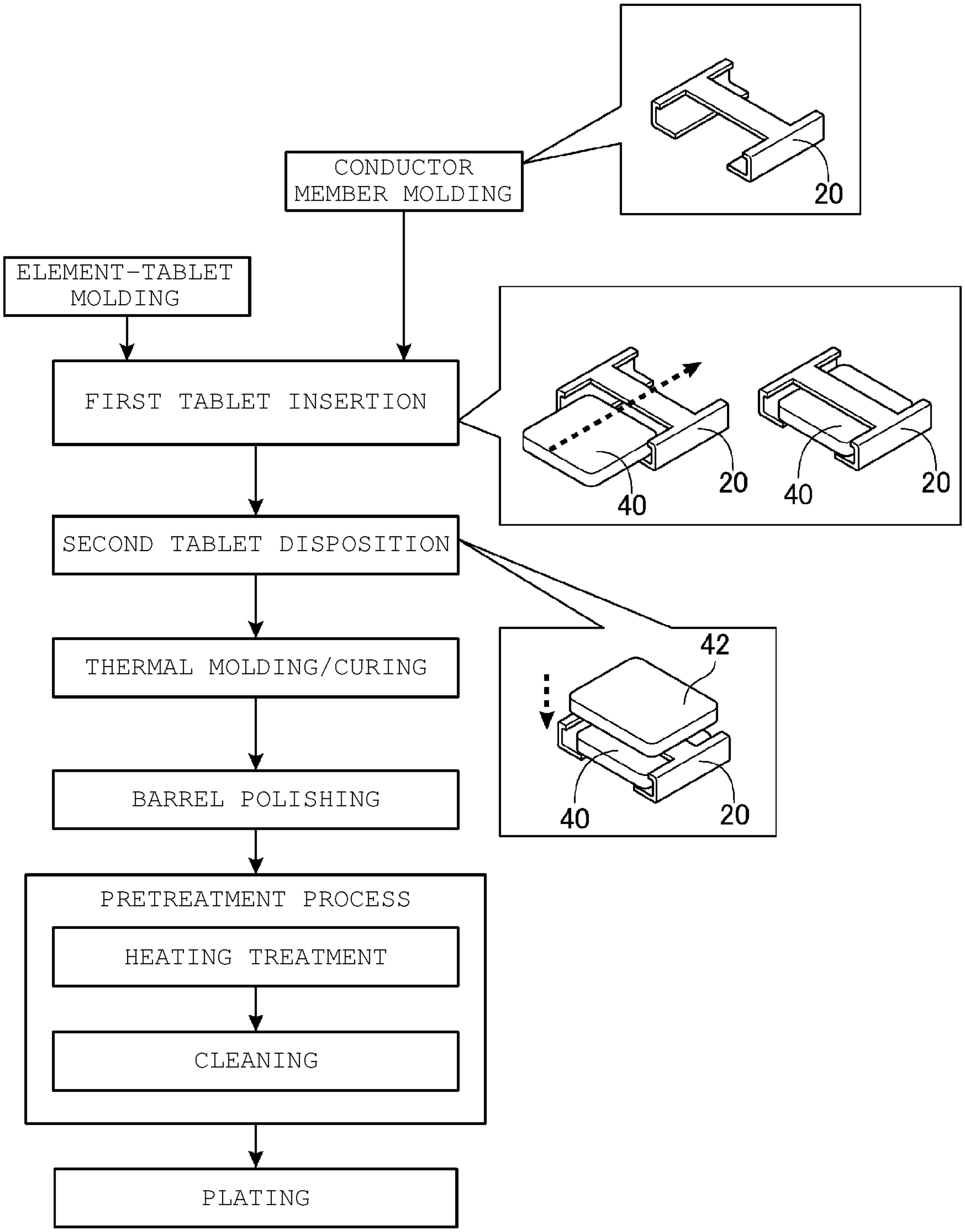
FIG. 6 is a schematic diagram of a manufacturing process of the inductor.

FIG. 6 is a schematic diagram of a manufacturing process of the inductor 1.

As illustrated in the drawing, the manufacturing process of the inductor 1 includes a conductor member molding process, an element-body tablet molding process, a first tablet inserting process, a second tablet disposing process, a thermal molding/curing process, a barrel polishing process, a pretreatment process, and a plating process.

The conductor member molding process is a process of molding the conductor 20.

In the present embodiment, first, a copper piece having a predetermined shape is formed by punching a copper plate having a predetermined thickness, and then the conductor 20 is formed by bending the copper piece. In this case, the first electrode portion 26 and the second electrode portion 27 of the electrode portion 24 are also bent. That is, by this conductor member molding process, the conductor 20 is formed which integrally includes the conductive wire portion 22 and the electrode portion 24 and in which the first electrode portion 26 and the second electrode portion 27 of the electrode portion 24 are also molded in advance (that is, preformed) before being embedded in the core 30.

The tablet molding process is a process of molding two preform bodies of a first tablet 40 and a second tablet 42.

The preform body is molded into a solid state which is easy to handle by pressurizing the mixed powder which is a material of the element body 2. Each of the first tablet 40 and the second tablet 42 is a preform body disposed on a lower side and an upper side of the conductive wire portion 22 of the conductor 20, and is molded in a substantially plate shape.

The first tablet inserting process is a process of inserting the first tablet 40 between the pair of electrode portions 24 on the lower side of the conductive wire portion 22 of the conductor 20 after setting the conductor 20 in a molding die. More specifically, the conductor 20 is provided with the electrode portion 24 having an L shape in the LT section at both end portions 22A of the conductive wire portion 22, and thus, the LT section has a substantially C shape, and the first tablet 40 is inserted into a space surrounded by the conductive wire portion 22 and the pair of electrode portions 24.

The second tablet disposing process is a process of placing the second tablet 42 on the conductive wire portion 22 of the conductor 20.

In the thermal molding/curing process, the first tablet 40, the conductor 20, and the second tablet 42 are integrated by applying heat to the first tablet 40 and the second tablet 42 set in the molding die while pressurizing the first tablet 40 and the second tablet 42 in an overlapping direction of the first tablet 40 and the second tablet 42 and curing them. As a result, a molded body including the conductor 20 is molded.

As described above, since the first tablet 40 is molded in a state of being accommodated in the space surrounded by the conductive wire portion 22 and the pair of electrode portions 24, the conductive wire portion 22 is embedded in the molded body, and the molded body in which the surface of the electrode portion 24 including the first electrode portion 26 and the second electrode portion 27 is exposed to be substantially flush with the core 30 is obtained. In addition, since the first electrode portion 26 and the second electrode portion 27 of the electrode portion 24 are formed in the conductor member molding process in advance, processing for forming the first electrode portion 26 and the second electrode portion 27 is not required for the molded body after molding.

The barrel polishing process is a process of barrel polishing the molded body, and a corner portion of the molded body is rounded by the process.

The pretreatment process is a pretreatment performed for plating the surface 24A of the electrode portion 24, and includes a heating process and a cleaning process.

The heating process is a process of heating the molded body after the barrel polishing to oxidize the surface of the molded body.

The cleaning process is a process of cleaning the surface 24A of the electrode portion 24 by immersing (that is, by wet etching) the molded body in a liquid agent that dissolves only the members of the electrode portion 24 (conductor 20).

The plating process is a process of sequentially applying nickel (Ni) plating and tin (Sn) plating on the surface 24A of the electrode portion 24 by barrel plating. Here, since the surface of the molded body is oxidized in the heating process, in the plating process, occurrence of so-called "plating elongation" in which plating extends from the surface 24A of the electrode portion 24 to the surface of the molded body is suppressed.

Next, the internal configuration of the inductor 1 will be described in detail.

Figure 7:
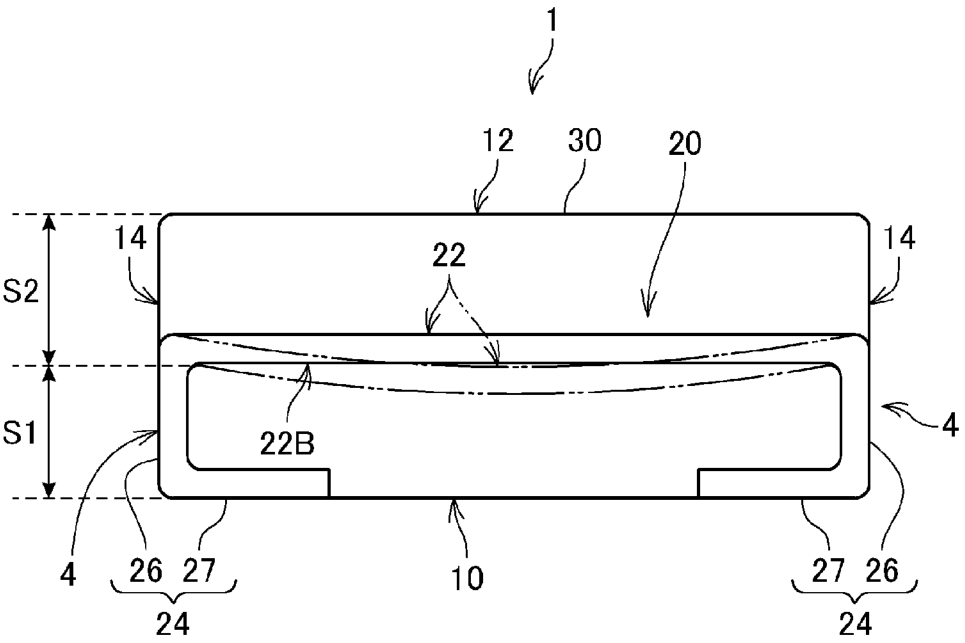
FIG. 7 is an sectional view of the inductor.

FIG. 7 is an LT sectional view of the inductor 1.

The LT sectional shape of the inductor 1 (core 30) is a substantially rectangular shape having the thickness T as a short side and the length L as a long side.

The conductor 20 includes a conductive wire portion 22 extending linearly in a direction of the length L substantially parallel to a mounting surface 10 corresponding to a bottom surface at the time of mounting, and an electrode portion 24 connected to both end portions 22A of the conductive wire portion 22. The electrode portion 24 extends along the end surface 14 and the mounting surface 10, and thus, the conductor 20 has a substantially C shape opened on the mounting surface 10 side in the LT section.

Figure 8:
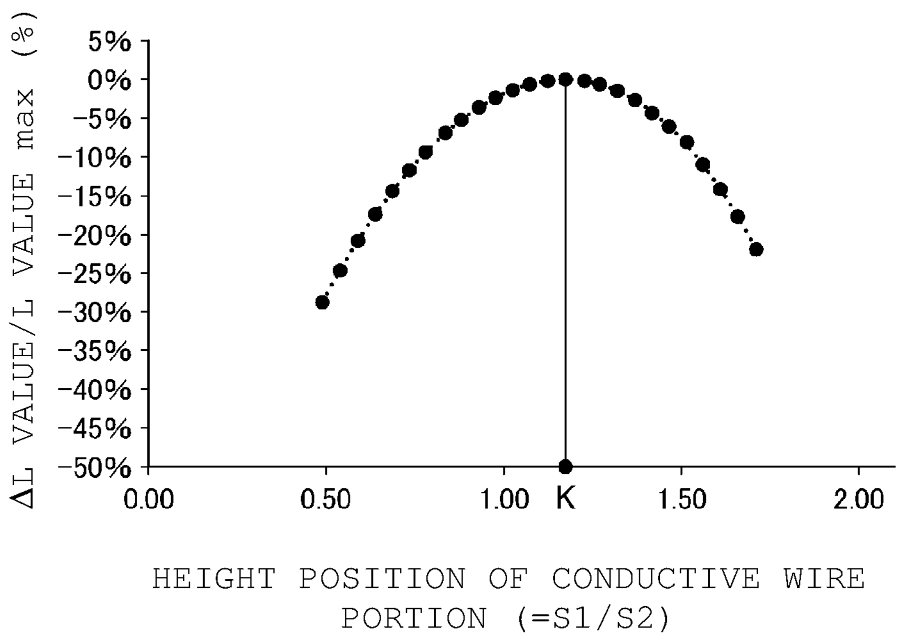
FIG. 8 is a diagram illustrating a relationship between a height position of a conductive wire portion and an inductance value in an section.

FIG. 8 is a diagram illustrating a relationship between a height position of the conductive wire portion 22 in the LT section and an inductance value.

FIG. 8 is a result of simulation analysis, and a horizontal axis indicates the height position of the conductive wire portion 22 by a ratio between a first dimension 51 and a second dimension S2. As illustrated in FIG. 7, the first dimension 51 is a distance from the mounting surface 10 to the bottom surface 22B of the conductive wire portion 22, and the second dimension S2 is a distance from the upper surface 12 to the bottom surface 22B of the conductive wire portion 22.

In a vertical axis of FIG. 8, the "ΔL value" means a decrease value from the maximum inductance value, and the "L value max" means the maximum inductance value.

As illustrated in FIG. 8, it can be seen that the inductance value changes in an upwardly convex quadratic function with the height position of the conductive wire portion 22 as a variable, and the maximum inductance value is obtained at the predetermined height position K. In the present embodiment, the dimensions of the core 30 and the conductor 20 are designed such that the conductive wire portion 22 is disposed at the predetermined height position K.

However, when the conductive wire portion 22 is deformed into an arcuate shape as indicated by a virtual line in FIG. 7 at the time of molding the core 30, the conductive wire portion 22 may deviate from the predetermined height position K, the inductance value may decrease, and the DC superimposed current may also decrease.

More specifically, the inductor 1 according to the present embodiment is molded as follows. That is, as illustrated in FIG. 6, first, in a first tablet inserting process and a second tablet disposing process, a first tablet 40 and a second tablet 42 are disposed above and below the conductor 20 in which the electrode portion 24 is preformed, and in the subsequent thermal molding/curing process, pressure is applied in an overlapping direction of the first tablet 40 and the second tablet 42. By this pressurization, the first tablet 40 and the second tablet 42 collapse, and the mixed powder constituting each of them flows so as to fill the gap in a cavity of a molding die.

Meanwhile, in the present embodiment, in order to reliably insert the second tablet 42 disposed on the lower side of the conductor 20 into the space surrounded by the conductive wire portion 22 and the pair of electrode portions 24, the second tablet 42 is formed in advance to have a size in which a slight gap is generated between the space and the second tablet 42. Therefore, a relatively large number of voids exist on the lower side of the conductive wire portion 22 than the upper side thereof, and the mixed powder flows from the upper side to the lower side of the conductive wire portion 22 at the time of pressurization. When the flow acts on the conductive wire portion 22, the conductive wire portion 22 is deformed in an arcuate shape toward the lower mounting surface 10 as indicated by a virtual line in FIG. 7.

When the conductor 20 in which the electrode portion 24 is not preformed, that is, the conductor 20 in which the end portion 22A of the conductive wire portion 22 is not bent is used at the time of molding, it is not necessary to reduce the size of the second tablet 42. Therefore, in this case, by appropriately increasing the size of the second tablet 42 as compared with the present embodiment, it is possible to eliminate the difference between the gap on the upper side and the gap on the lower side of the conductive wire portion 22 and to prevent the flow from generating the arcuate deformation in the conductive wire portion 22. However, when the conductor 20 that is not preformed is used for molding, the electrode portion 24 of the conductor 20 is bent after the core 30 is molded to form the first electrode portion 26 and the second electrode portion 27. Therefore, the first electrode portion 26 and the second electrode portion 27 protrude from the surface of the core 30, and the inductor 1 is increased in size by the thickness (plate thickness of the conductor 20) of the first electrode portion 26 and the second electrode portion 27, and it is difficult to reduce the size.

Therefore, the conductor 20 of the present embodiment is configured to obtain higher rigidity than a simple plate shape in order to make it difficult for the conductive wire portion 22 to be deformed in an arcuate shape against the flow of the mixed powder at the time of pressurization though the electrode portion 24 is formed.

Figure 9:
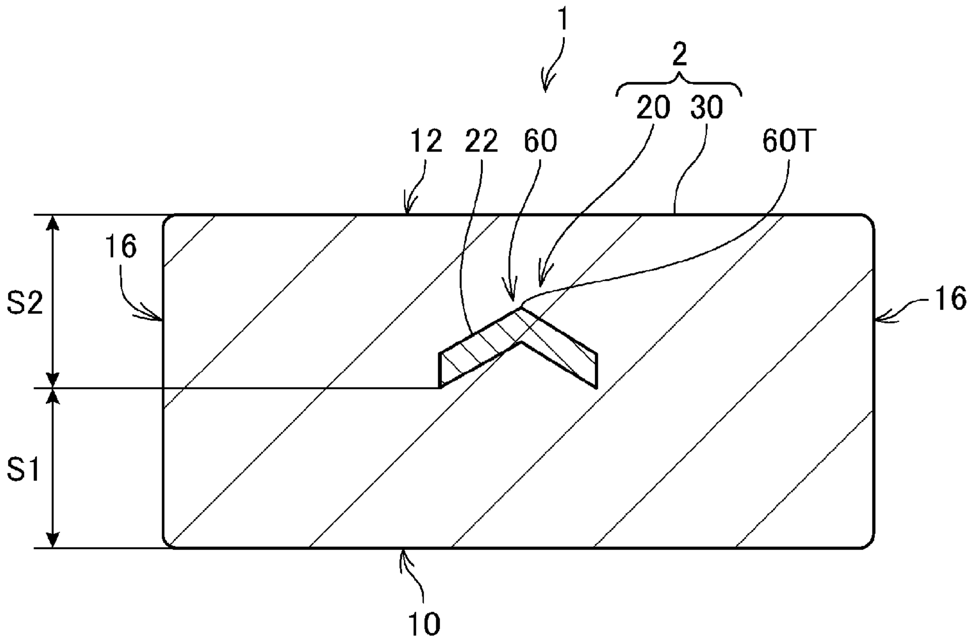
FIG. 9 is a sectional view of the inductor.

FIG. 9 is a WT sectional view of the inductor 1.

The WT section is a section taken along a WT plane including the directions of the width W and the thickness T of the core 30, and the WT section of the conductive wire portion 22 is a section (that is, a transverse section) taken along a plane orthogonal to an extension direction (in the present embodiment, it is the same as a direction of the length L of the inductor 1) of the conductive wire portion 22.

The conductive wire portion 22 has a reinforcing portion 60. The reinforcing portion 60 aims to reduce bending of the conductive wire portion 22 in the vertical direction of the element body, and extends along the extension direction of the conductive wire portion 22.

As illustrated in FIG. 9, the reinforcing portion 60 is formed in a V shape by bending. As a result, high rigidity can be obtained as compared with the case of a simple rectangular shape.

Note that the conductive wire portion 22 has a width larger than a predetermined value in a state before the formation of the reinforcing portion 60 such that the conductive wire portion width WA after the formation of the reinforcing portion 60 becomes the predetermined value in plan view viewed from the upper surface 12.

In addition, in FIG. 6, in order to prevent the drawing from being complicated, illustration of the reinforcing portion 60 of the conductive wire portion 22 is omitted.

The reinforcing portion 60 has a convex shape protruding toward the upper surface 12 side of the core 30 in the WT section. Since the reinforcing portion 60 has a convex shape protruding toward the upper surface 12 side of the core 30, it is difficult to deform with respect to the flow of the mixed powder from the upper side to the lower side of the conductor 20. In addition, as compared with the configuration in which the reinforcing portion 60 protrudes toward the mounting surface 10, the reinforcing portion 60 does not interfere with the first tablet 40 in the first tablet inserting process, and the first tablet 40 is not easily inserted, or the size of the first tablet 40 is not necessarily further reduced.

Note that the WT sectional shape of the reinforcing portion 60 may be a U-shape having an arcuate apex 60T.

As illustrated in FIG. 5, the reinforcing portion 60 is formed over substantially the entire length of the conductive wire portion 22, and has sufficient rigidity against the flow of the mixed powder. Note that the reinforcing portion 60 may be provided on a portion of the entire length of the conductive wire portion 22 as long as sufficient rigidity can be obtained.

Figure 10:
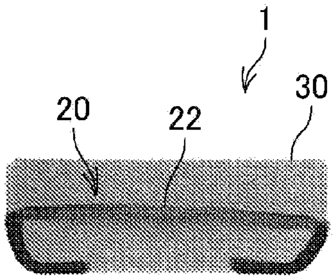
FIG. 10 is an X-ray photograph of the inductor taken from a side surface.
Figure 10:
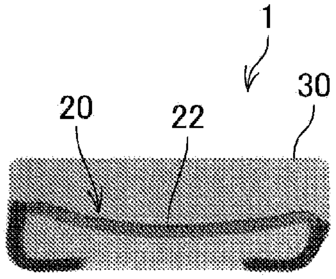
Figure 11:
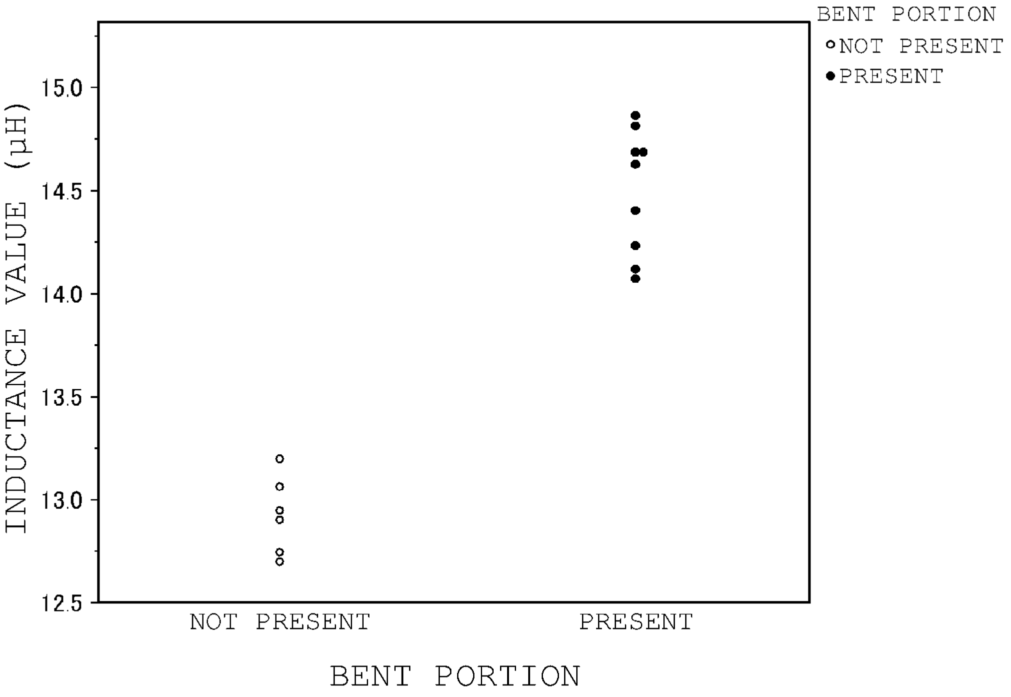
FIG. 11 is a diagram illustrating a measurement result of an inductance value.

FIG. 10 is an X-ray photograph of the inductor 1 taken from the side surface 16 (LT surface), and FIG. 11 is a diagram illustrating a measurement result of the inductance value.

As illustrated in FIG. 10, in a case where the conductive wire portion 22 does not have the reinforcing portion 60, the conductive wire portion 22 is remarkably deformed in an arcuate shape in the inductor 1 after manufacturing, whereas in a case where the conductive wire portion 22 has the reinforcing portion 60, the arcuate deformation of the conductive wire portion 22 is suppressed. As illustrated in FIG. 11, in the case where the conductive wire portion 22 includes the reinforcing portion 60, the arcuate deformation of the conductive wire portion 22 is suppressed, and thus, the inductance value is maintained at a high value as compared with the case where the conductive wire portion 22 does not include the reinforcing portion 60.

According to the present embodiment, the following effects are obtained.

The inductor 1 of the present embodiment is an inductor 1 in which the conductor 20 is embedded in the core 30 containing magnetic powder, in which the conductor 20 includes a conductive wire portion 22 extending inside the core 30 over the pair of end surfaces 14 and an electrode portion 24 led out from each of the end surfaces 14 and extending along the end surface 14 and the mounting surface 10, and the conductive wire portion 22 has a reinforcing portion 60 in a WT section (transverse section).

According to this configuration, compared to a case where the WT sectional shape of the conductive wire portion 22 is a simple rectangular shape, rigidity is increased, and arcuate deformation during molding can be suppressed.

In the inductor 1 of the present embodiment, the reinforcing portion 60 has a shape protruding to an upper surface 12 side of the core 30 in the WT section.

This makes it difficult for the mixed powder (magnetic powder) to be deformed against the flow from the upper side to the lower side of the conductor 20.

In addition, as compared with the configuration in which the reinforcing portion 60 protrudes toward the mounting surface 10, the reinforcing portion 60 does not interfere with the first tablet 40 in the first tablet inserting process, and the first tablet 40 is not easily inserted, or the size of the first tablet 40 is not necessarily further reduced.

In the inductor 1 according to the present embodiment, since the WT surface shape of the reinforcing portion 60 is an inverted V shape or an inverted U shape, the reinforcing portion 60 can be easily formed by bending the conductive wire portion 22 in the conductor member molding process (FIG. 6) of preforming the conductor 20.

Note that the above-described embodiment is merely an example of one aspect of the present disclosure, and can be arbitrarily modified and applied without departing from the gist of the present disclosure.

In the inductor 1 of the above-described embodiment, as long as the distance from the mounting surface 10 to the conductive wire portion 22 is the first dimension Si (FIG. 7) corresponding to the predetermined height position K, the reinforcing portion 60 of the mounting surface may have a shape protruding to the mounting surface 10 side in the WT section, and specifically, the reinforcing portion 60 may have a V shape or a U shape in the WT section.

Figure 12:
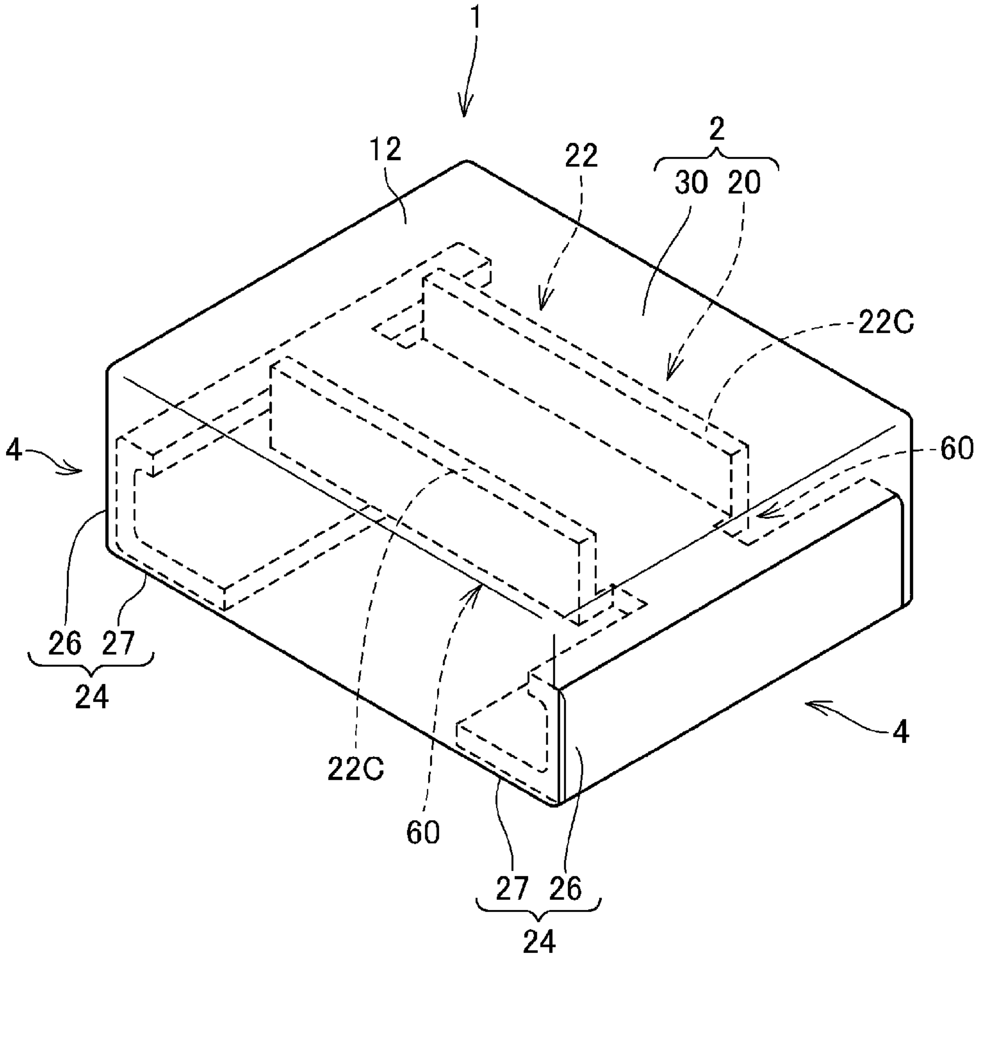
FIG. 12 is a perspective view illustrating an internal configuration of an inductor according to a modification of the present disclosure.

In addition, as illustrated in FIG. 12, the reinforcing portion 60 of the conductive wire portion 22 may include an extension portion 22C extending from both or one (both in the illustrated example) of both edges in the width direction of the conductive wire portion 22, and the deflection of the conductive wire portion 22 may be suppressed by the extension portion 22C.

The directions such as horizontal and vertical directions, various numerical values, shapes, and materials in the above-described embodiment include a range (so-called equivalent range) in which the same functions and effects as those of the directions, numerical values, shapes, and materials are exhibited unless otherwise specified.

What is claimed is:

1. An inductor comprising:

a core containing magnetic powder, and a conductor embedded in the core, wherein the core includes a mounting surface facing a mounting substrate side at a time of mounting and a pair of end surfaces orthogonal to the mounting surface, the inductor includes a conductive wire portion extending inside the core over the pair of end surfaces and electrode portions, each of the electrode portions being led out from a respective one of the pair of end surfaces and extending along the respective one of the end surfaces and the mounting surface, and the conductive wire portion includes a reinforcing portion that includes an extension portion extending from an edge of the conductive wire portion in a width direction.

2. An inductor comprising:

a core containing magnetic powder, and a conductor embedded in the core, wherein the core includes a mounting surface facing a mounting substrate side at a time of mounting, a pair of end surfaces orthogonal to the mounting surface, and an upper surface facing the mounting surface, the inductor includes a conductive wire portion extending inside the core over the pair of end surfaces and electrode portions, each of the electrode portions being led out from a respective one of the pair of end surfaces and extending along the respective one of the end surfaces and the mounting surface, and the conductive wire portion includes a reinforcing portion that has a convex shape which protrudes toward an upper surface side of the core in a transverse cross section of the conductive wire portion.

3. The inductor according to claim 2, wherein the reinforcing portion has a V shape or a U shape in a transverse cross section of the conductive wire portion.

4. An inductor comprising:

a core containing magnetic powder, and a conductor embedded in the core, wherein the core includes a mounting surface facing a mounting substrate side at a time of mounting and a pair of end surfaces orthogonal to the mounting surface, the inductor includes a conductive wire portion extending inside the core over the pair of end surfaces and electrode portions, each of the electrode portions being led out from a respective one of the pair of end surfaces and extending along the respective one of the end surfaces and the mounting surface, and the conductive wire portion includes a reinforcing portion that has a V shape or a U shape in a transverse cross section of the conductive wire portion.

5. The inductor according to claim 4, wherein the reinforcing portion has the V shape in the transverse cross section of the conductive wire portion.

6. The inductor according to claim 4, wherein the reinforcing portion has the U shape in the transverse cross section of the conductive wire portion.

7. The inductor according to claim 3, wherein the reinforcing portion has the V shape in the transverse cross section of the conductive wire portion.

8. The inductor according to claim 3, wherein the reinforcing portion has the U shape in the transverse cross section of the conductive wire portion.

* * * * *